United States Patent [19]
Okano

[11] Patent Number: 6,126,172
[45] Date of Patent: Oct. 3, 2000

[54] METAL GASKET WITH PARTIAL SUPPORT PORTION

[75] Inventor: Takashi Okano, Southfield, Mich.

[73] Assignee: Ishikawa Gasket Co., Ltd., Tokyo, Japan

[21] Appl. No.: 09/062,640

[22] Filed: Apr. 20, 1998

[51] Int. Cl.⁷ ..................................... F02F 11/00
[52] U.S. Cl. ............................ 277/593; 277/600
[58] Field of Search ..................... 277/593, 595, 277/600

[56] References Cited

U.S. PATENT DOCUMENTS

| 5,131,668 | 7/1992 | Uchida | 277/295 |
| 5,511,796 | 4/1996 | Udagawa | 277/593 |
| 5,560,623 | 10/1996 | Yoshino | 277/595 |
| 5,582,415 | 12/1996 | Yoshida et al. | 277/595 X |

Primary Examiner—Anthony Knight
Assistant Examiner—Karlena D. Schwing
Attorney, Agent, or Firm—Kaensaka & Takeuchi

[57] ABSTRACT

A metal cylinder head gasket of the invention is used for an internal combustion engine. The gasket is basically formed of a metal plate, a sealing device, and a thin support portion. The metal plate includes a plurality of first holes corresponding to cylinder bores, at least one second hole corresponding to another hole, and a side portion around the second hole. The sealing device is disposed on the metal plate outside the side portion relative to the second hole, and surrounds the second hole for sealing the same. The thin support portion is located inside the sealing device and is disposed on a part of the side portion around the second hole without extending the entire side portion. The support portion supports a part of a pressure applied thereto to securely seal around the second hole.

9 Claims, 1 Drawing Sheet

METAL GASKET WITH PARTIAL SUPPORT PORTION

BACKGROUND OF THE INVENTION AND RELATED ART STATEMENT

The present invention relates to a metal cylinder head gasket with a partial support portion around a hole to be sealed.

An internal combustion engine has been developed to provide light weight and high power. For this purpose, a cylinder head is made of light metal or alloy thereof, such as aluminum alloy. The rigidity of the cylinder head made of light metal or alloy is not so strong. On the other hand, since a metal gasket is strong against high temperature and pressure, the metal gasket has now been used widely as a cylinder head gasket.

In case the cylinder head as stated above is attached to a cylinder block with the metal gasket therebetween, since the rigidity of the cylinder head is not so strong, the edge portions, especially longitudinal end portions of the gasket are liable to be strongly compressed. Extremely speaking, a center area of the cylinder head projects upwardly.

Also, when the engine as explained above is actuated, the edge portions vibrate severely. In case a sealing bead is located at the edge portion, the sealing bead is beaten by the cylinder head to cause creep relaxation. Thus, fluid leakage may happen in a long usage.

Namely, in the engine, the gasket edge portions receive strong pressure when the gasket is tightened. Also, the gasket edge portions are likely to vibrate.

In order to support tightening pressures at the gasket edge portions and reduce the vibration, various proposals have been made. For example, support beads are formed at the gasket edge portions, as disclosed in U.S. Pat. No. 5,427,389. Also, support beads are formed around the cylinder bores located at the longitudinal side portions, as disclosed in U.S. Pat. No. 5,439,234. Further, shims are disposed at the lateral side portions of the gasket, as disclosed in U.S. Pat. No. 5,538,263.

On the other hand, in the metal gasket, a bead is often formed around a hole to be sealed. When the bead is compressed, the bead provides a surface pressure to seal around the hole. In case the bead is substantially flattened when the gasket is installed in the engine, the bead may creep in a long usage. Thus, a flange or solid portion may be formed inside the bead, or a surface pressure regulation plate may be disposed outside the bead so that the bead is not completely flattened.

The above conventional gaskets operate properly, as intended. However, the above gaskets can not solve all the problems, and there arise problems to be solved.

One object of the invention is to provide a metal cylinder head gasket, which can support a part of a pressure applied to the gasket.

Another object of the invention is to provide a metal cylinder head gasket as stated above, wherein creep relaxation of sealing means formed around a hole is prevented.

A further object of the invention is to provide a metal cylinder head gasket as stated above, wherein the sealing means can be compressed as equal as possible.

Further objects and advantages of the invention will be apparent from the following description of the invention.

SUMMARY OF THE INVENTION

A metal cylinder head gasket of the invention is used for an internal combustion engine having a plurality of cylinder bores and at least one hole. The gasket is basically formed of a first metal plate, sealing means, and a thin support portion.

The first metal plate extends substantially throughout an entire area of the gasket, and includes a plurality of first holes corresponding to the cylinder bores, at least one second hole corresponding to the hole, and a side portion around the second hole. The sealing means is disposed on the first metal plate outside the side portion relative to the second hole, and surrounds the second hole for sealing the same.

The thin support portion is located inside the sealing means and disposed on the side portion around the part of the second hole without extending an entire area around the second hole. The support portion supports a part of a pressure applied thereto when the gasket is tightened.

Namely, in the invention, the thin support portion is formed only a part of the side portion of the second hole, where a high surface pressure is applied. The thin support portion properly supports the local high pressure, so that the sealing means can securely seal around the entire area of the hole to be sealed.

The first metal plate may have a rectangular shape with two longitudinal end portions. In this case, the second hole is located in at least one of the two longitudinal end portions, and the side portion is located near an edge of the one of the two longitudinal end portions. The longitudinal end portions vibrate severely, but the thin support portion prevents creep relaxation of the sealing means.

The thin support portion may be a part of the first metal plate and disposed on the first metal plate by turning around a part of the second hole. The thin support portion may be a metal shim fixed onto the first metal plate, or a grommet disposed around a part of the second hole. The sealing means may be a bead integrally formed with the first metal plate. In this case, the thin support portion is located on a projecting side of the bead.

The metal cylinder head gasket of the invention may further include second and third metal plates to constitute a metal laminate gasket.

DETAILED DESCRIPTION OF PREFERRED EMBODIMENTS

Figure 1:
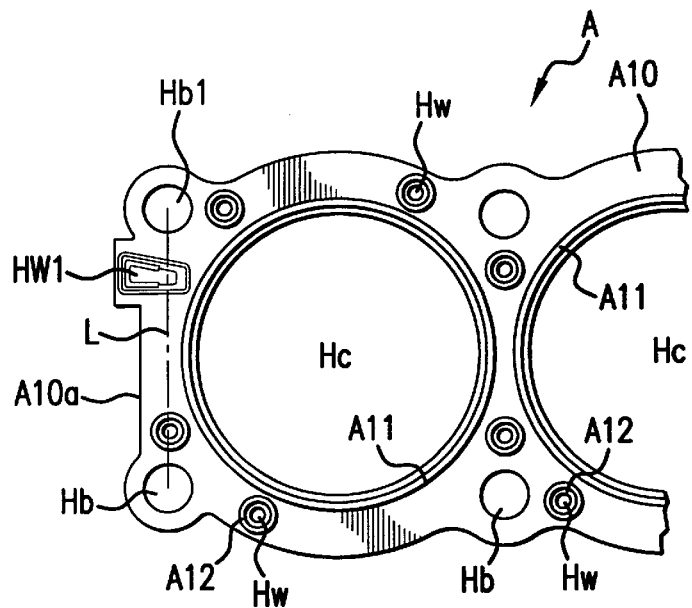
FIG. 1 is a partial plan view of a first embodiment of a metal cylinder head gasket of the invention.
Figure 2:
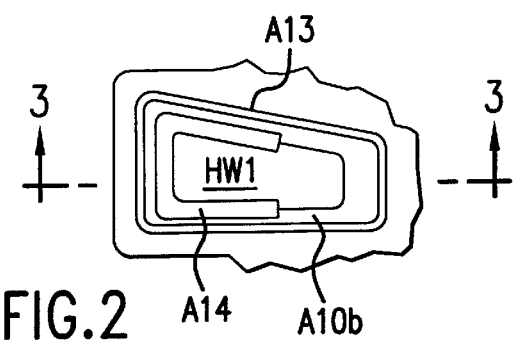
FIG. 2 is an enlarged plan view of a part of the metal cylinder head gasket shown in FIG. 1.
Figure 3:
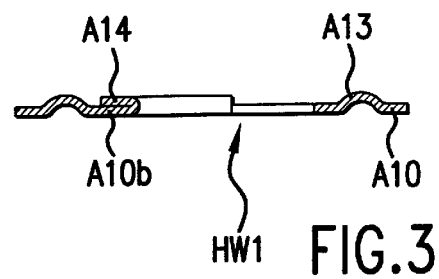
FIG. 3 is a sectional view taken along line 3—3 in FIG. 2.

Preferred embodiments of the invention will be described with reference to the drawings. A first embodiment A of a metal cylinder head gasket of the invention is shown in FIGS. 1–3. The gasket A is formed of one metal plate A10, and includes a plurality of cylinder bores Hc, water holes Hw, Hw1, bolt holes Hb, Hb1 and so on, as in the conventional gasket. Beads A11, A12 are formed on the metal plate A10 for sealing around the cylinder bores Hc and water holes Hw, respectively.

The gasket A has an elongated or generally rectangular shape, wherein the water hole Hw1 is located at a longitudinal edge area close to the bolt hole Hb1. Especially, a part of the water hole Hw1 is located outside a line L linking between the centers of the two bolt holes Hb, Hb1 located close to a longitudinal edge A10a of the gasket A.

In this gasket A, when the gasket A is tightened between a cylinder head and a cylinder block (both not shown), a large tightening pressure is applied at the side close to the longitudinal edge A10a and the bolt hole Hb1. If a bead is simply formed around the water hole Hw1, the bead is strongly compressed at the side close to the longitudinal edge A10a and the bolt hole Hb1 to cause creep relaxation, which results in a water leakage from the water hole Hw1.

In view of the problem, the sealing around the water hole Hw1 has been made according to the present invention. Namely, a bead A13 is formed around the water hole Hw1, and a support plate A14 is disposed on a part of an edge portion A10b of the water hole Hw1. The support plate A14 is formed as a part of the metal plate A10 and is turned to laminate on a part of the edge portion A10b.

The support plate A14 does not extend all around the water hole Hw1, and is located nearly a half of the edge portion A10b close to the longitudinal edge A10a. The thickness of the support plate A14 is less than the height of the bead A13. The support plate A14 does not overlap the bead A13 to partially support the pressure applied to the bead A13.

When the gasket A is situated between the cylinder head and the cylinder block and is tightened therebetween, the bead A13 around the water hole Hw1 is compressed. Since the support plate A14 is located partly around the water hole Hw1, the bead A13 is not completely compressed or flattened even at the portion where the support plate A14 is not disposed adjacent to the bead A13, i.e. opposite side of the edge A10a. A large tightening force is properly supported by the support plate A14.

When the engine with the gasket A is operated, the engine vibrates. Especially, the longitudinal edge portions of the gasket vibrate severely. Since the support plate A14 is located near the longitudinal edge A10a inside the bead A13, the bead A13 is not fully compressed by the vibration of the engine. Thus, the creep relaxation of the bead A13 is prevented.

In this respect, if the support plate A14 is formed all around the edge portion A10b of the water hole Hw1, the tightening force and vibration force applied partly strongly around the water hole Hw1 can not be properly supported. For example, if a pressure applied to the water hole Hw1 is supported by a support plate extending around the entire edge of the water hole, a part of the bead can be supported by the support plate, but a part of the bead may not be sufficiently compressed to cause leakage from the water hole.

In the gasket A of the invention, a part of the pressure is supported by the support plate only at the required portion. As a result, the bead, as a whole, can be sufficiently compressed to securely seal around the water hole.

Figure 4:
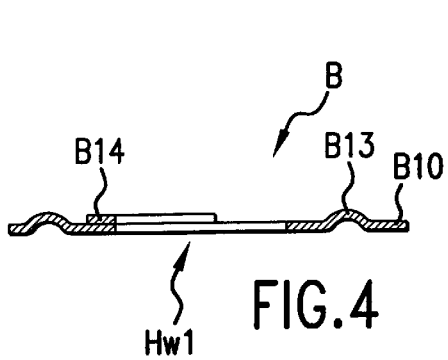
FIGS. 4–6 are sectional views, similar to FIG. 3, for showing second to forth embodiments of the invention.

FIG. 4 shows a second embodiment B of the metal cylinder head gasket of the invention. The gasket B is formed of one metal plate B10, and includes a water hole Hw1 and a bead B13, similar to the gasket A. In the gasket A, the support plate A14 is integrally formed with the metal plate A10 and is turned on the plate A10, but in the gasket B, a shim B14 is formed separately from the metal plate B10. The shim B14 is laminated on and fixed to the metal plate B10 around a part of the edge portion of the water hole Hw1. The rest of the structure is the same as the gasket A. The gasket B operates as in the gasket A.

Figure 5:
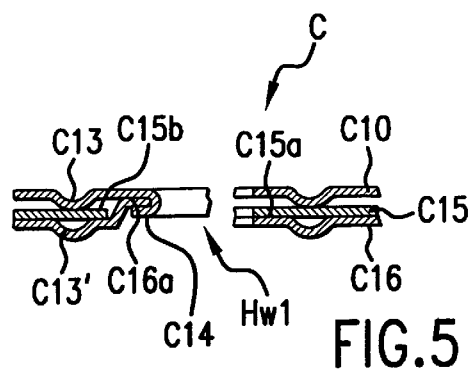

FIG. 5 shows a third embodiment C of the metal cylinder head gasket of the invention. The gasket C is a laminate type formed of an upper plate C10, a middle plate C15, and a lower plate C16, which extend substantially throughout an entire area of the gasket.

The upper plate C10 includes a bead C13 around the water hole Hw1, and a support plate C14 integrally formed with the upper plate C10 and made by turning a part of the upper plate C10. The support plate C14 extends only a half around the water hole Hw1, similar to the support plate A14. In the middle plate C15, a part C15a of the middle plate C15 located at a side close to the cylinder bore Hc extends to the edge of the water hole Hw1, while a part C15b is located slightly away from the water hole Hw1 so that the part C15b does not overlap the support plate C14. The lower plate C16 includes a bead C13' around the water hole Hw1, and extends generally close to the edge of the water hole Hw1. A part C16a of the edge of the lower plate C16 is sandwiched between the support plate C14 and the upper plate C10.

In the gasket C, the part C16a, the support plate C14 and the upper plate C10 constitute a solid portion, which corresponds to the portion indicated by the support portion A14 in FIG. 2. The thickness of the solid portion is greater than the total thickness of the plates C10, C15, C16, so that the solid portion protects the beads C13, C13' from creep relaxation. The beads C13, C13' securely seal around the water hole Hw1, as in the gasket A.

Figure 6:
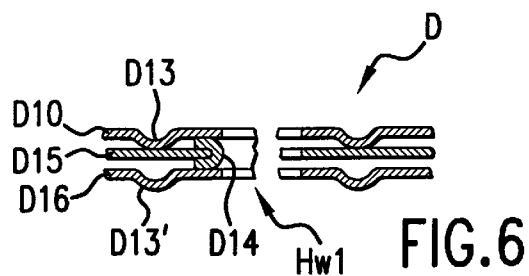

FIG. 6 shows a fourth embodiment D of the metal cylinder head gasket of the invention. The gasket D is a laminate type, and is formed of an upper plate D10 with a bead D13, a middle plate D15 and a lower plate D16 with a bead D13', similar to the gasket C. In the gasket D, a support plate D14 has a shape similar to a grommet with upper and lower flanges and a curved portion for connecting the upper and lower flanges, and is attached to the middle plate D15. The support plate D14 does not extend all around the edge of the water hole Hw1, but extends a part of the water hole Hw1 corresponding to the support plate A14 shown in FIG. 2. The support plate D14 prevents creep relaxation of the beads D13, D13', which can securely seal all around the water hole Hw1, as in the gasket A.

In the gasket of the invention, the support portion or plate is formed only partly at the edge portion of the water hole where a large pressure is applied. The support portion does not extend over the entire edge portion. As a result, the local high pressure applied to the bead is properly supported by the support portion. As a whole, the bead around the hole is compressed generally equally to securely seal around the hole.

While the invention has been explained with reference to the specific embodiments of the invention, the explanation is illustrative and the invention is limited only by the appended claims.

What is claimed is:

1. A metal cylinder head gasket for an internal combustion engine having a plurality of cylinder bores and at least one fluid hole, comprising:

a first metal plate extending substantially throughout an entire area of the gasket, said first metal plate having a plurality of first holes corresponding to the cylinder bores, at least one second hole corresponding to the at least one fluid hole, and a side portion around the second hole;

sealing means disposed on the first metal plate outside the side portion relative to the second hole, said sealing means surrounding the second hole for sealing the same; and a thin support portion located between the second hole and the sealing means surrounding the second hole and disposed on a part of the side portion around the second hole without extending the entire side portion around the second hole, said support portion supporting a part of a pressure applied thereto.

2. A metal cylinder head gasket according to claim 1, wherein said first metal plate has a rectangular shape with two longitudinal end portions, said at least one second hole being located in one of the two longitudinal end portions so that the thin support portion is located at a side close to an edge of the one of the two longitudinal end portions to prevent creep relaxation of the sealing means.

3. A metal cylinder head gasket according to claim 2, wherein said thin support portion is a part of the first metal plate and is disposed on the first metal plate by turning around the at least one second hole.

4. A metal cylinder head gasket according to claim 2, wherein said thin support portion is a metal shim fixed onto the first metal plate.

5. A metal cylinder head gasket according to claim 2, wherein said thin support portion is a grommet disposed around a part of the at least one second hole.

6. A metal cylinder head gasket according to claim 2, wherein said sealing means is a bead integrally formed with the first metal plate, said thin support portion being located on a projecting side of the bead.

7. A metal cylinder head gasket according to claim 2, further comprising a second metal plate disposed under the first metal plate and having a bead operating as the sealing means.

8. A metal cylinder head gasket according to claim 7, further comprising a third metal plate situated between the first and second metal plates, said first metal plate having a bead, said beads formed on the first and second metal plates operating as the sealing means.

9. A metal cylinder head gasket according to claim 8, wherein said thin support portion is a part of the first metal plate and is disposed under the second metal plate by turning around a part of the at least one second hole.

\* \* \* \* \*